United States Patent [19]
Rehm

[11] 3,883,225
[45] May 13, 1975

[54] METHODS AND APPARATUS FOR TREATING ACQUIRED MYOPIA AND SIMILAR OR RELATED EYE CONDITIONS

[76] Inventor: Donald S. Rehm, R.D. 3, Box 317, Ligonier, Pa. 15658

[22] Filed: Oct. 18, 1973

[21] Appl. No.: 407,460

Related U.S. Application Data

[63] Continuation-in-part of Ser. No. 303,464, Nov. 6, 1972, abandoned.

[52] U.S. Cl. ................... 350/146; 351/39; 351/158
[51] Int. Cl. ........................ G02b 25/00; A61b 3/00
[58] Field of Search ........ 350/145, 146, 143; 351/6, 351/12, 18, 26, 39, 2, 158

[56] References Cited
UNITED STATES PATENTS

| | | | |
|---|---|---|---|
| 2,485,411 | 10/1949 | Pratt et al. | 351/158 X |
| 2,559,698 | 7/1951 | Bahre | 350/145 |
| 2,666,360 | 1/1964 | Collins | 350/143 X |
| 2,845,842 | 8/1958 | Leitz et al. | 350/145 X |
| 3,039,351 | 6/1962 | Spagna et al. | 350/145 X |
| 3,458,246 | 7/1969 | Krebs | 350/146 |

*Primary Examiner*—Paul A. Sacher
*Attorney, Agent, or Firm*—Donn J. Smith

[57] ABSTRACT

Therapeutic optical apparatus comprises an optical system for splitting and deflecting objective light, together with reflectors for reflecting the split portions of the light along parallel paths into the eyes of the patient, in avoidance of both convergence and stereopsis. Viewing lenses are juxtaposed to the patient's eyes and are provided with such power as to counteract the tendency of the eyes to accommodate for close work.

A corresponding therapeutic method is disclosed. In accordance respectively with other features of the invention, modified or additional method steps involve the use of viewing lenses afforing an essentially zero accommodation, adding algebraically and progressively positive diopter increments to the viewing lenses as the patient's eyes improve, and similarly and progressively changing the patient's distance lenses.

25 Claims, 7 Drawing Figures

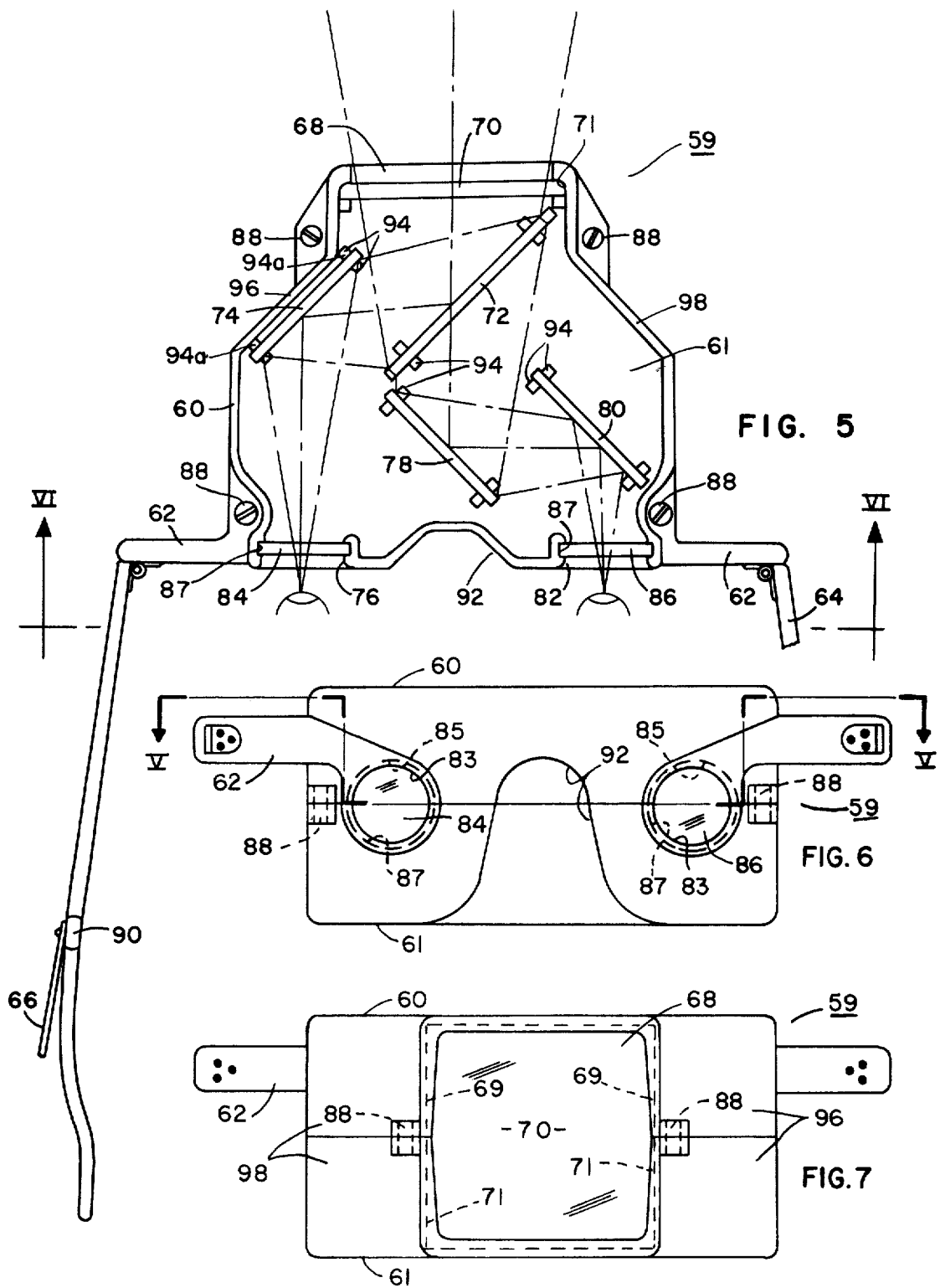

METHODS AND APPARATUS FOR TREATING ACQUIRED MYOPIA AND SIMILAR OR RELATED EYE CONDITIONS

The present application is a continuation-in-part of my copending application for Optical Viewer filed Nov. 6, 1972, Ser. No. 303,464, now abandoned.

This invention relates to optical method and apparatus, and more particularly to a therapeutic program for the treatment of acquired myopia and related conditions.

Although the invention is described principally in connection with the treatment and prevention of acquired myopia, the invention is applicable to related eye conditions, as noted below.

Myopia, often referred to as nearsightedness, is a condition in which the eye can properly focus on objects only when the objects are within a predetermined relatively short distance from the eye. Objects beyond this point result in a blurred image because parallel rays entering the eye will come to a focus in front of the retina. The condition of myopia is sometimes due to malformation of the eye or a lens defect, but it is also quite often due to a spastic or non-relaxed condition of the ciliary muscle which flexes the lens in order to focus on fairly close objects.

For many years it was thought that the condition of myopia was largely inherited. Recently, certain researches indicate, on the other hand, that the condition is usually acquired. For example, it has been found that 45% of the younger portion (age 40 and below) of the Eskimo population at Barrow, Alaska have a myopic condition. The older portion of the population (age 41 and up) however, who never attended school and are largely illiterate, are almost free (1½%) of this condition. In more literate societies, the condition usually appears in the 10 to 15 year age bracket of school children, of whom about 20% exhibit the myopic condition. Considering only the aforementioned Eskimo population between ages 11 and 40, inclusive, over 51% exhibit a myopic condition.

Myopia can be acquired by the lower animals also. A number of monkeys were provided with shrouds or hoods such that their eyes could not be focused at distance but only upon the close-up near surfaces of the hood or shroud. It was determined that about 75% of these experimental animals developed myopia averaging ¾d.

In initial tests conducted with the method and apparatus of the present invention, it has been determined that improvement is plus ½ diopter or more in the normal or conventional distance correction for myopic individuals. This improvement has been obtained only after 6 weeks employment of the method and apparatus of the invention. such improvement is doubly surprising in view of the usual progressive aggravation of the myopic condition under known methods of treatment.

When the eye is used extensively in focusing on fairly close objects, as, for example, in reading, the ciliary muscle becomes unable fully to relax, and the suspensory ligament for the lens is no longer able to return the lens to a fully relaxed condition. The eye, therefore, becomes unable to focus an image on the retina when the object being viewed is far enough away that the light comes from the object to the eye in a bundle of substantially parallel rays. Usually attendant upon the spastic condition of the ciliary muscles, the eyeball progressively elongates in an attempt to facilitate focusing upon the retina. The myopic condition is further aggravated by such elongation.

Under the conditions referred to, the eye is usually provided with a corrective lens which will permit the lens of the eye to focus at a nominal distance, for example 20 feet. The light rays coming to such a lens in a parallel manner are caused to diverge somewhat behind the lens as though the rays were coming from an object closer to the eye, and these divergent rays can then be focused by the eye on the retina thereof.

However, when such lenses are used for reading or other close work, the ciliary muscle must then tighten even more in order to focus the eye properly, thus tending to cause the myopia to increase.

Sometimes, a patient's eyes are purposely fitted with less than the full distance correction in order to reduce the progression of his myopia. If the patient is given reading glasses which are about three diopters less concave than his normal distance correction, he will be able to see clearly only out to a distance of 0.33 meters. If a book if placed at this distance, his eyes will obtain a clear image without needing to focus (accommodate) at all.

A feature of the human optical system that is not compensated in this manner, however, is concerned with the convergence of the eyes in order to direct the lines of sight from both eyes at the object viewed which, as mentioned, is in this case a printed page.

Since, normally, the convergence of the eyes is adjusted in conformity with the distance of the viewed object, there is a natural relationship between the convergence of the eyes and the action of the ciliary muscle in flexing the lens of the eye. Thus, if the eyes are provided with lenses which relax the ciliary muscle at the reading distance, and the eyes are convergent so that both are directed at the same point on the material being read, the eyes are under an unnatural condition and are, in fact, in a condition of strain.

Attempts have been made to solve this problem by using prisms (base in) with the undercorrected reading glasses. In this way, the visual axes can be made les converging or even completely parallel. This, however, does not solve the problem and eye strain still results. One reason is that quite strong prisms are necessary, and distortion is unavoidable, causing eye strain. Another reason is that we have the ability to see objects in stereoscopic relief. Whenever we look at a close object, each eye does not see exactly the same picture. That is, the images on the two retinas differ in both position and appearance.

Therefore, when undercorrected lenses are used together with prisms for reading in an attempt to relax the eyes by making them "believe" they are looking into the distance, each eye is still seeing a different view of the book. The resulting eye strain can prevent satisfactory improvement of the vision.

The present invention eliminates accommodation, convergence and stereoscopic effect and therefore overcomes the above-mentioned limitations. When the method and apparatus of the invention are used together with the proper lenses (about 3 diopters less concave than the normal distance correction), the eyes can be used for close work and still be completely relaxed.

Because myopia is caused largely by a chronic contraction of the ciliary muscles, any method for treating myopia, to be effective, must apply some positive force to cause the ciliary muscles to relax. Any such therapeutic technique must, however, consider both accommodation and convergence demands upon the eyes, as well as the normal ability of the eyes to view objects stereoscopically. Until the advent of my invention no therapeutic technique has been available to control effectively and simultaneously accommodation, convergence and stereopsis, while exerting a more or less continuous relaxant force upon the ciliary muscles. At the outset of my novel therapeutic program, convergence and stereopsis of the eyes are reduced essentially to zero by making the eyes "believe" that are looking into distance during reading or other close-up activities. This immediately restores the normal proportionality between convergence and stereopsis of the eyes.

During the treatment program, relaxant force is continuously applied to the ciliary muscles, which in the state of acquired myopia have been forced to overaccommodate, as it were. My therapeutic program involves a deaccommodation of the eyes until the degree of accommodation is essentially zero for normal eyes for close work. Where the ciliary muscles are contracted into a spastic overaccommodation of the eyes, the condition of "zero" accommodation is continuously changing as the eyes improve. The ciliary muscles are forced to relax progoressively by my treatment, and the condition of "zero" accommodation for the spastic eye differs at each stage of treatment. Throughout the treatment program the eyes then are viewing close work, as if the work were at a considerable distance. Thus, accommodation is brought into balance or proportionality with convergence and stereopsis of the eyes, and the myopic condition essentially disappears at the end of the progressive therapeutic program of the invention. Thereafter, my therapeutic program is continued in a more or less stabilized manner to prevent recurrence of the myopic condition. My method and apparatus can also be used to prevent myopia and related eye conditions and to alleviate certain forms of far-sightedness, such as presbyopia.

If an aquired myopic condition already exists in the patient's eyes, the instrument can be used to force the ciliary muscle to relax and to force the eyeball to shorten (if it has become elongated, as is often the case in myopia). For this purpose, the lenses can be chosen so that when the close work is held at its normal distance, the rays come to a focus slightly in front of the retina.

This results in a blurred image on the retina. As the patient's eyes attempt to see this blurred image clearly, the ciliary muscles are forced to relax. Also, if the eyes have become elongated due to the myopic condition, they will tend to shorten in order to allow the rays to come to a focus on the retina.

As the vision improves, the patient will find that he must hold the book farther and farther away to get a blurred image. When this reading position becomes uncomfortable, the viewer lenses should be changed in the positive diopter direction so that the patient can hold the book closer. Usually the viewer lenses can be changed ("undercorrected") by plus one-half diopter increments, although individual anomalies may dictate increments of different sizes. With this program of "decorrection," the ciliary muscles are progressively forced to relax and the patient's eyes (if elongated) commence to shorten until approximately normal eyeball conditions are attained. The decorrection portion of the therapeutic program, in most cases, should terminate with lenses having a maximum correction of plus 2.5 or plug 3.0 diopter, i.e., whatever lens power is necessary for each eye of the patient to read or to do other close work with essentially zero accommodation. At the end of the program the patient's eyes, when using my novel viewing apparatus, can read or view other nearly objects with essentially zero convergence, essentially zero stereopsis, and essentially zero accommodation. Under these conditions proportionality is maintained, and no eyestrain developes. A minimal usage of the viewing apparatus for close work thereafter prevents regression to the myopic condition.

The distance lenses should also be changed periodically so that the patient is never overcorrected. When the vision has returned to normal, or near normal, a distance correction will no longer be required, but the viewer should continue to be used for all prolonged close work, to prevent regression to the myopic condition. For this, the viewer should be provided with the aforesaid plus 2.5 or plus 3 diopter lenses.

When the patient is not using the viewer, he should normally wear a conventional distance correction in order to maintain the proper relationship between accommodation and convergence at all times. It is advisable, however, to undercorrect the distance glasses by about one-half diopter to stimulate further relaxation of the spasm and to ensure that the patient does not become overcorrected as the vision improves. In most instances the conventional distance correction can be diminished (decorrected) similarly, i.e., by plus one-half diopter increments in conformance to the schedule of progressive viewer lens changes.

Ordinarily, astigmatism should not be corrected in either the viewer lenses or the distance lenses since an astigmatic correction tends to perpetuate astigmatism just as a myopic correction tends to perpetuate myopia. The astigmatism should be given an opportunity to improve at the same time as the myopia is improving.

The method and apparatus of the invention are also applicable to treatment of related eye conditions such as presbyopia, myopic astigmatism, and diplopia. The condition of diplopia is alleviated by my method and viewing apparatus in that convergence of the eyes is obviated during reading or other close work. Myopic astigmatism usually disappears upon alleviation of the individual's acquired myopia. The invention is applicable for alleviation of presbyopia, as noted below.

With the foregoing in mind, the primary objective of the present invention is the provision of method and apparatus which will permit and individual having myopia to view close objects, such as when reading, in which eye strain is completely eliminated.

Another object of this invention is the provision of a method of viewing relatively close objects, when the individual has myopia, which will reduce eye strain and thereby promote improvements in the individual's vision.

A further object of the present invention is the provision of a method and apparatus of the nature referred too which is convenient to use.

A separate object is the provision of a method and apparatus which can be used by persons who have difficulty maintaining convergence, in order to enable such persons to look at close objects without needing to converge.

A further object is the provision of a method and opthalmological apparatus whereby the user is capable of viewing a nearby object in detail while the eyes of the user are relaxed as if the object were at a considerable distance.

A further object is the provision of a viewing method and apparatus for eliminating accommodation, convergence and stereopsis when viewing nearby objects.

Further objects include the provision of methods and apparatus for treating acquired myopia, presbyopia, myopic astigmatism and diplopia; the provision of methods and apparatus for maintaining proportionality between accommodation, stereopsis and convergence of the eyes during corrective procedures; and the provision of methods and apparatus for effecting the progressive relaxation of the ciliary muscles.

The foregoing objects as well as still other objects and advantages of the present invention will become more apparent upon reference to the following detailed specification taken in connection with the accompanying drawings in which:

FIG. 5 is a horizontally sectioned view of another viewing apparatus according to the invention and taken along reference lines V—V of FIG. 6;

FIG. 6 is a rear elevational view of the viewing apparatus as shown in FIG. 5 and taken along reference lines VI—VI thereof; and, FIG. 7 is a front elevational view of the viewing apparatus of FIGS. 5 and 6.

The present invention employs unexpected optical methods and apparatus for treating acquired myopia and related conditions, in which the light from an object is split into two substantially equal parts. The light parts are deflected away from each other and then directed straight into the eyes of the user in a direction parallel to the original light coming from the object.

The optical apparatus or viewer which accomplishes the foregoing can be provided with a prism or mirror type beam splitter in the center on the objective side which splits the incoming beam or light into two laterally directed beams of light. Each of the laterally directed beams of light is then again deflected by a prism or mirror directly in front of the respective eye and directed thereby into the eye.

By interposing a suitable lens in front of each eye, the eye can be caused to relax completely at, for example, reading distance and by utilizing my novel optical apparatus the eyes of the user can assume the proportional degree of convergence for a completely relaxed lens, namely, zero convergence, whereby the eyes are used under conditions of no strain whatsoever.

The viewing apparatus according to the present invention is adapted for being secured directly to conventional eyeglass frames, or the apparatus can, itself, be provided with corrective lenses and be suspended from the head of the user. In the latter arrangement the viewing apparatus can be equipped with temple pieces, or with an elastic headband, head strap or the like, or with a combination of these.

Figure 1:
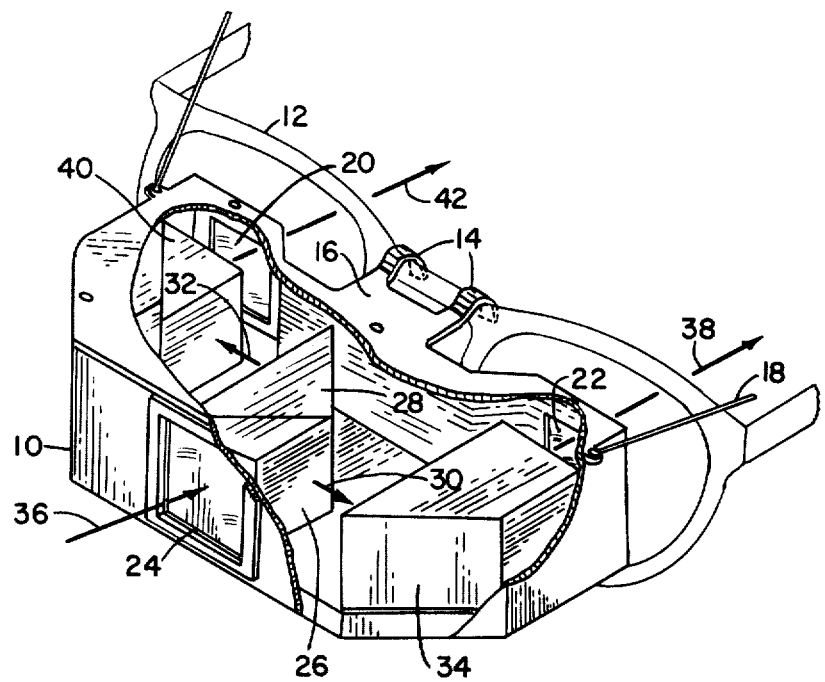
FIG. 1 is an isometric view partly broken away showing one form of viewing apparatus according to the present invention.

Referring to the drawings somewhat more in detail, FIG. 1 shows a viewer, generally indicated at 10, suspended from a conventional set of eyeglasses, indicated at 12, by hook elements 14 provided on the frame 16 of the viewer. The viewer may also be provided with further supporting means such as elastic band 18 adapted to engage the head of the user of the viewer.

The viewer, on the head side, is provided with viewing apertures 20 and 22 which may, as illustrated, be provided with optically ground, non-corrective cover glasses to prevent the interior of the frame 16 of the viewer from becoming soiled.

On the side of the viewer facing away from the head, an objective aperture 24 is provided, which also may have a cover glass of the type mentioned above, and which is advantageously located about half-way between viewing apertures 20 and 22.

Immediately behind objective aperture 24 is a beam splitter consisting of prisms 26 and 28 which have one surface thereof cemented together so that light entering the objective aperture 24 will be split into two parts and one of which is indicated by arrow 30 and the other of which is indicated by arrow 32.

The beam part indicated by arrow 30 falls on a third prism 34 and is deflected thereby through viewing aperture 22 in a direction parallel to the light entering objective aperture 24 from the object being viewed. This last mentioned light is indicated by arrow 36 and the light leaving viewing aperture 22 is indicated by arrow 38.

Similarly, part 32 is deflected by a prism 40 in front of viewing aperture 20 and is deflected so as to pass through viewing aperture 20 as indicated by arrow 42 and in a direction parallel to both arrow 36 and arrow 38.

With lenses in the spectacles 12 correctly selected, the user of the viewer can look straight ahead with no convergence of the eyes and with the lenses of the eyes fully relaxed and can focus on a close object, a printed page, for example, and thereby read or do close work with no eye strain whatsoever.

Figure 2:
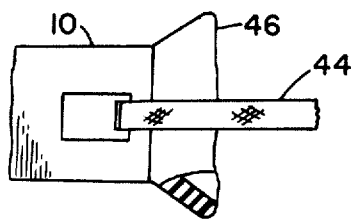
FIG. 2 is a partial elevational view showing a modified form of the apparatus shown in FIG. 1.

In the arrangement shown in FIG. 2, the same viewer is employed, but is adapted for being suspended directly on the head by elastic means 44 while a rubber-like shield 44 is provided surrounding the viewing apertures and also surrounding the eyes of the user in order to exclude extraneous light. In the case of the viewer of FIG. 2, corrective lenses can be embodied directly in the viewer, in place of the planar eye-aperture lenses of FIG. 1.

Figure 3:
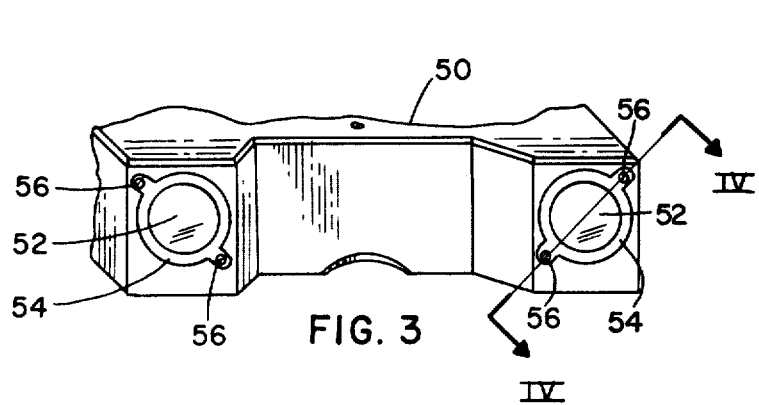
FIG. 3 is a partial isometric view of the side of the apparatus which faces the eyes showing corrective lenses mounted in the apparatus.
Figure 4:
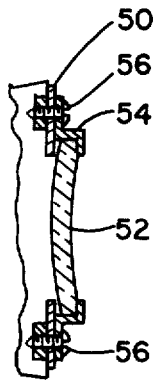
FIG. 4 is a sectional view of the apparatus as shown in FIG. 3 and taken along reference lines IV—IV thereof.

FIGS. 3 and 4 show how a viewer 50 can have replaceable corrective lenses 52 mounted in the viewing apertures and retained therein as by rings 54 secured to the frame of the viewer by screws 56. The lenses 52 are readily replaceable so that upon improvement of an eye condition, the lenses can be replaced with different ones to provide for the necessary correction.

Inasmsuch as individuals will vary as to the precise interpupillary distance, namely, the lateral center to center distance between the eyes, the prisms 40, 34, may be laterally adjustable in the frame of the viewer in any suitable manner. The prisms shown in FIG. 1 are all right angle prisms and are of good optical quality so that very little loss of light occurs in passing through the viewer.

It will be understood, however, that, while a prism arrangement is illustrated, and has a high degree of efficiency in transmitting light, other optical arrangements may also be used for splitting the beam and for deflecting it, for example, mirrors.

For example, a half-silvered mirror can be employed for splitting a beam, and mirrors, especially polished metal mirrors, can be employed for deflecting the beam at right angles. It will, therefore, be understood that in the claims the terms "splitting" and "deflecting" comprehend the use of other known devices for the purposes of splitting a beam of light and for deflecting it.

FIGS. 5–7 shows a modified arrangement of my viewing apparatus 59 in which mirrors are employed. The arrangement of FIG. 5 comprises upper and lower housing components 60 and 61, the upper component 60 of which is integrally connected with a spectacle frame 62 having temple bars 64 and to which can be connencted elastic means 66 for holding the frame on the head of the user. When secured together the housing components 60 and 61 define an objective aperture 68 preferably closed by a glass 70 the lateral edges of which are retained in mating grooves 69 and 71 formed respectively in the upper and lower housing components 60 and 61. Disposed behind objective aperture 68 and supported at an angle of 45° is a half-silvered mirror 72 and which can consist of a single sheet of glass or two sheets of glass in face to face engagement with the half-silvering at the juncture of the sheets of glass.

The half-silvered mirror or other suitable beam-splitter 72 directs one part of the light entering objective aperture 68 toward a full mirror 74 disposed at 45° in front of a viewing aperture 76. The other part of the light entering the objective aperture 68 passes through half-silvered mirror 72 and is deflected by a further full mirror 78 disposed at 45 degrees and directly behind half-silvered mirror 72. Mirror 78 deflects the light falling thereon laterally to another full mirror 80 disposed at 45° degrees in front of the other viewing aperture 82.

Apertures 76 and 82 are provided with lenses 84 and 86, respectively, which can be corrective lenses or which may be plain glass, as determined by the therapeutic program outlined above and described in greater detail below. By use of the term "lens" or "lenses" I intend to include planar (plano) lenses, either optically ground or of plain glass. I also intend to include lenses having some prescriptive correction, such as cylindrical, other than a "power" or spherical (convex or concave) configuration.

The lenses, 84, 86 are also retained by the housing components 60, 61 when the latter are joined to enclose the optical system of the viewing apparatus 59. When so joined, the housing components 60, 61 define a pair of eye openings 83 which are shaped complementarily with the lenses 84, 86. Each housing component 60 or 61 includes a pair of grooves 85 or 87 which entrap the edges of the lenses 84, 86 when the housing components 61, 61 are secured together as described below. Although the lenses 84, 86 and associated opening 83 and grooves 85, 87 are illustrated as circular or semicircular, it will be understood that some other convenient configuration can be employed.

It will be evident that the apparatus 59 of FIGS. 5–7 is operative in substantially the same manner as the previously described modification having prisms therein but is capable of being manufactured more readily. The housing 60–61 of the optical apparatus 59 can be molded, and the upper and lower parts 60, 61 can be joined together as by screws 88 after being molded and after the several mirrors and closing glasses and lenses have been put in place.

The temple bars 64 are advantageously hinged to the upper housing component 60, and elastic means 66 are preferably secured to projections 90 upstanding from the temple bars. When the device is in place, the bridge portion 92 of the device will rest on the nose of the wearer and the device will, therefore, be held in place and located by the temple bars and the elastic means 66 passing around the head. Optionally, the elastic means 66 could take the form of an adjustable nonelastic band.

The beam splitter 72 and mirrors 74, 78, 80 of the optical system of the viewing apparatus 59 desirably are cemented to one of the housing components 60, 61, for example to the bottom wall of the lower housing component 61. The optical components can, however, be prepositioned by pairs of positioning studs 94 or grooves (not shown) molded integrally with the housing component 61. Similar and cooperative positioning studs or grooves can be formed integrally in the upper housing component 60.

The side wall portions 96 (FIGS. 5 and 7) of the upper and lower housing components 60, 61 desirably are angled so as to be substantially parallel to the adjacent mirror 74, in order to conserve space within the housing 60–61 and to facilitate molding thereof. The opposite wall portions 98 can be similarly angled for symmetry. If desired the adjacent mirror 74 can be cemented flushly to one of the first-mentioned angled wall portions 96, in which case at least the adjacent positioners 94a can be omitted.

To facilitate fabrication, insertion and replacement of the lenses 84, 86 these lenses desirably are made circular when provided with either a planar or spherical configuration. eye if the lenses are furnished with a cylindriform prescription for severe cases of astigmatism or with prismatic configurations for severely crossed or divergent eyes, the lenses and adjacent portions of the housing 60–61 desirably are oval or other noncircular configuration to preserve a proper orientation with respect to the eyes, particularly during any replacement thereof for the progressive therapeutic program of the invention.

The closure glass 70 of the objective aperture 68 can also be provided as a power lens, which can be changed periodically (instead of changing the eye lenses 84, 86) during the progressive stages of the therapeutic program of the invention. This can be used to advantage where the objective lens configuration is planar or involves a purely spherical correction which is the same for both eyes. The lens 70 can be replaced by separating and remating the housing components 60, 61 as described above in connection with the eye lenses 84, 86 of FIGS. 5–7.

A proper use of the optical apparatus described above in a controlled therapeutic program is designed to eliminate the harmful effects of prolonged close work, which now appears as the most common cause of the myopic condition. The viewing apparatus should be positioned as close to the eyes as possible so that the use obtains the largest possible field of view. The aforementioned adjustable strap can be employed to hold the unit snugly but comfortably on the user's head. The therapeutic program of the invention will be described with reference to the optical apparatus 59 of FIGS. 5–7, although applicable also to the viewer of FIGS. 1–4.

At the beginning of the therapeutic program planar or prescriptive lenses 84, 86 are installed as outlined above. The power of these lenses 84, 86 can be determined by algebraically adding +3.0d. to the power of any distance prescription of the patient. For example, if the patient uses −5.5d distance lenses, the initial power of the lenses 84, 86 would be −2.5d. If −2.0 d lenses are normally worn by the patient for distance vision the lenses 84, 86 initially should have a power of +1.0d. If the patient's distance correction were −3.0d, the lenses 84, 86 initially would be planar (plano-plano).

For the vast majority of myopic patients an assortment of lenses 84, 86 ranging for example from −3.0d to +3.0d in half diopter increments can be provided, although other ranges and increments can be utilized depending upon the application of the invention of the range of refractive errors in a specific group of patients.

In any event, that power is selected for the lenses 84, 86, which cause the words of a book or other close work to appear slightly blurred when the work is held at the patient's normal reading distance. This slight blurring indicates that a beneficial, relaxing force is being imposed upon the ciliary muscles. as the eyes attempt to focus the image more clearly, the ciliary muscles are forced to relax. Imposition of this relaxant force results from action of the meridianal fibers of the ciliary muscles, which fibers act in opposition to the circular fibers, to create an active force to relax the ciliary spasm as the eyes attempt to see the blurred image clearly. If the book is not held far enough away to cause the print to be slightly blurred, much of the corrective action of the therapeutic program of the invention will be lost, and improvement will be retarded. As the patient's eyes gradually become less myopic it will be necessary to hold the book or other close work farther and farther away to obtain a blurred effect.

When the reading distance becomes so great as to be uncomfortable or difficult to hold, the lenses 84, 86 should be increased in power in the positive diopter direction. Desirably, this is accomplished in about +0.5 diopter increments (added algebraically). For example, if the initial power of the lenses 84, 86 is −2.5d, the second of lenses used in the therapeutic program would be about −2.0d. This progressive "decorrection" can, of course, be varied for individual patients.

After each such incremental change, a book or other close work held at normal reading distance, should again appear slightly blurred. With further relaxation of the ciliary muscles, the work is moved progressively away to maintain a relaxant upon the ciliary muscles. This portion of the program is continued until it is time for the next incremental change in the lenses 84, 86.

The lenses 84, 86 of the viewing apparatus 59 can be changed simply by removing the four screws 88, separating the housing components 60, 61, and removing and reinserting the old and new lenses 84, 86 respectively, whereupon the housing components 60, 61 are remated and the screws 88 refastened. When the power of the objective lenses 84, 86 has thus been changed, the book or other close work is again at the image-blurring position and progressively moved farther away as before. This procedure is continued with successive incremental and algebraic increases in lens power (in the positive diopter direction).

The viewing apparatus of the invention should be worn when performing any near-point task (at reading distance). As this is not always possible, a minimum usage period of 3 hours per day is suggested. If the therapeutic program of the invention is employed for all close wowrk, a noticeable improvement in the myoptic condition should occur in as little as 6 to 8 weeks. More extensive usage of the viewing apparatus results in more rapid and noticeable improvement.

When close work is not being done, and if only a mild degree of myopia is present, the patient need not wear corrective distance lenses throughout the therapeutic program. If the myopia is more advanced, distance glasses should be worn but should be slightly undercorrected to aid in relaxing the ciliary muscles. A +0.5d undercorrection is usually satisfactory. It would be noted that the undercorrected distance lenses do not aid in improving the myopic condition but simply provide acuity for distance vision. However, when the patient, even in passing, views intermediate and near-point objects (when the viewing apparatus of the invention is not being used) the distance lenses are vital. If distance lenses were not worn in cases of advanced myopia, the patient's eyes would not be induced to accommodate, although a substantial amount of convergence would be required. This would upset the patient's normal accommodation/convergence proportionality, and enough strain would result to retard the vision improvement otherwise obtainable from the therapeutic program of the invention.

Once embarked upon the therapeutic program, the patient should observe two precautions whenever he must perform close work without wearing the viewing apparatus of the invention. Firstly, use as much illumination as practical, and secondly, hold the work as far as practical from the eyes. Less accommodation is required by the eyes at higher illumination levels and, of course, at greater distances.

As the myopic condition improves, the patient's distance correction should be periodically changed in the positive diopter direction to prevent overcorrection. Desirably, the patient's distance glasses are similarly and incrementally changed whenever the lenses 84, 86 are changed. The distance lenses can also be changed in +0.5d increments.

When a patient's vision has returned to normal, or near normal, the conventional distance correction will, of course, no longer be required. Continued use of the viewing apparatus of the invention is desirable, however, for all prolonged close work to prevent regression to the myopic condition. At that time and for most patients the lenses 84, 86 normaly would be +2.5 or +3.0d.

Initially, some patients may exhibit diplopia when using the viewing apparatus of the invention, i.e., a double image will be seen. This results from the patient's subconscous awareness of the close object and automatic convergence, although no convergence or accommodation is required when using the instrument, beyond the overaccommodated or acquired myopic condition of the eyes. This form of diplopia can be overcome by moving the book or other object away until only a single image is seen. The object can then be brought closer, while the single image is maintained until it is back at the normal reading distance.

For those patients who have difficulty converging the eyes (diplopia), the viewing apparatus and method of the invention are applicable as essentially zero convergence and accommodation are acquired, and proportionality can be maintained in avoidance of eyestrain.

Astigmatism, particularly myopic astigmatism, requires special consideration in the therapeutic program of the invention. If the patient is only slightly astigmatic, the condition should not be corrected in either the lenses 84, 86, etc., or in the patient's conventional distance lenses. If the astigmatism is pronounced, it should be largely undercorrected. Much astigmatism is a result of the myopic contraction of the ciliary muscles, which often contract unequally in the chronically overstrained condition. The astigmatism, then, will improve as the myopic condition improves. If the astigmatism were fully corrected, this defect would tend to be "locked" into the eyes, in much the same manner as the usual conventional "minus" spherical lenses tend to perpetuate myopia.

As noted above the therapeutic viewing apparatus and method of the invention can be used advantageously by patients who have lost some of their ability to accommodate (presbyopia) and who therefore require reading glasses. The usual reading glasses enable these patients to read with lesser or no accommodation, but convergence still is required. The normal accommodations/convergence proportionality of the eyes is altered and eye strain is experienced. By using the viewing apparatus of the invention with suitable reading lenses 84, 86 the patient can read with essentially no accomodation or convergence, and eye strain disappears.

From the foregoing it will be seen that novel and efficient methods and apparatus for treating acquired myopia and similar or related eye conditions has been described herein. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

What is claimed is:

1. Therapeutic optical apparatus comprising a housing, an objective aperture on one side of the housing, a pair of viewing apertures on the other side of said housing, means for securing said housing to the head of the user with said viewing apertures substantially in alignment with the user's eyes, lighth beam-splitting and deflecting means mounted in said housing in juxtaposition to said objective aperture, a pair of light reflectors mounted in said housing in juxtaposition to said splitting and deflecting means, said reflectors being disposed to receive respective split portions of light passing through said objective aperture and to reflect said respective split portions through said viewing apertures respectively into the user's eyes, the reflected split portions being essentially parallel to the path of light entering said objective aperture in order to eliminate the effects of convergence and stereopsis, and lens means mounted on said housing and covering said viewing apertures for imparting an essentially zero accommodation to the eyes when viewing close work.

2. The combination according to claim 1 wherein said reflectors are disposed at a substantial angle to said entering light beam path, and a wall portion of said housing is disposed in substantial conformance to said angle.

3. The combination according to claim 1 wherein at least one wall of said housing has means integrally formed therewith for substantially prepositioning said splitting means and said reflectors.

4. The combination according to claim 3 wherein one of said prepositioning means includes a wall portion of said housing disposed essentially parallel to an angular disposition of one of said reflectors.

5. The combination according to claim 1 wherein said housing includes similar mating housing components, means are provided for detachably joining said housing components, the junction therebetween passing through said viewing apertures, and means are disposed on said housing components for entrapping said eye lenses in said viewing apertures respectively upon fastening said housing components together.

6. The combination according to claim 5 wherein transparent closure means are provided for said objective aperture, said housing junction passing through said objective aperture, said closure means also being entrapped therein when said housing components are fastened together.

7. A therapeutic method for the treatment of acquired myopia and related or similar eye conditions, said method comprising the steps of splitting light reflected from a nearby object into two parts at a point, deflecting said light parts laterally away from one another, again deflecting said light parts at second points spaced equal distances on opposite sides of a line parallel to said object light and passing through said splitting point, spacing said second points from one another substantially the same distance as the pupils of a patient, said light parts being deflected from said second points along lines essentially parallel to one another and to said first-mentioned line so as to be directed to the patient's eyes in avoidance of convergence and stereopsis, placing in front of each eye that lens which imposes a relaxant force upon the ciliary muscles of the eye when engaged in reading or other close work, and selecting said eye lenses such that the eyes view close-up objects with an essentially zero accommodation.

8. The method according to claim 7 including the modified step of selecting said lenses with a power of about +2½ to +3 diopters.

9. A therapeutic method for the treatment of acquired myopia and related or similar eye conditions, said method comprising the steps of splitting light reflected from a nearby object into two parts at a point, deflecting said light parts laterally away from one another, again deflecting said light parts at second points spaced equal distance on opposite sides of a line parallel to said object light and passing through said splitting point, spacing said second points from one another substantially the same distance as the pupils of a patient, said light parts being deflected from said second points along lines essentially parallel to one another and to said first-mentionend line so as to be directed to the patient's eyes in avoidance of convergence and stereopsis, placing in front of each eye that lens which imposes a relaxant force upon the ciliary muscles of the eye when engaged in reading or other close work, and progressively changing the power of said lenses in the positive diopter direction until the patient's ciliary muscles become relaxed to an essentially zero-accommodation condition when viewing close-up objects.

10. The method according to claim 9 including the modified step of changing said lenses in about +0.5d increments.

11. The method according to claim 9 including the additional step of progressively changing the patient's distance correction in the position diopter direction.

12. The method according to claim 10 including the additional step of similarly and progressively changing the patient's distance correction.

13. The method according to claim 9 including the modified step of selecting the power of each such progressive lens change to provide a slightly blurred image at normal reading distance, and the additional steps of progressively moving the work farther away as the blurring clears between each such progressive lens change.

14. A therapeutic method for the treatment of acquired myopia and related or similar eye conditions, said method comprising the steps of splitting light reflected from a nearby object into parts at a point, deflecting said light parts laterally away from one another, again deflecting said light parts at second points spaced equal distances on opposite sides of a line parallel to said object light and passing through said splitting point, spacing said second points from one another substantially the same distance as the pupils of a patient, said light parts being deflected from said second points along lilnes essentially parallel to one another and to said first-mentioned line so as to be directed to the patient's eyes in avoidance of convergence and stereopsis, placing in front of each eye that lens which imposes a relaxant force upon the ciliary muscles of the eye when engaged in reading or other close work, and configuring said lenses by adding algebraically about +3 diopters to the patient's conventional distance prescription.

15. The method according to claim 14 including the additional step of providing a distance correction by adding algebraically about +½ diopter to the patient's conventional distance prescription.

16. A therapeutic method for the treatment of acquired myopia and related or similar eye conditions, said method comprising the steps of splitting light reflected from a nearby object into two parts at a point, deflecting said light parts laterally away from one another, again deflecting said light parts at second points spaced equal distances on opposite sides of a line parallel to said objct light and passing through said splitting point, spacing said second points from one another substantiallly the same distance as the pupils of a patient, said light parts being deflected from said second points along lines essentially parallel to one another and to said first-mentioned line so as to be directed to the patient's eyes in avoidance of convergence and stereopsis, placing in front of each eye that lens which imposes a relaxant force upon the ciliary muscles of the eye when engaged in reading or other closer work, and selecting those lenses which impart a slight blurring when an object is held at normal reading distance in provision of said relaxant force.

17. Therapeutic optical apparatus comprising an optical system directing objective light along essentially parallel paths respectively into the eyes of a patient in avoidance of convergence of the patient's eyes, said paths being essentially parallel to the path of said objective light, and lens means disposed respectively in said parallel paths and juxtaposeod to the patient's eyes for imparting an essentially zero accommodation in the patient's eyes for close work in dependence upon any spastic contraction of the patient's ciliary muscles.

18. A therapeutic method for the treatment of acquired myopia and related or similar eye conditions, said method comprising the steps of directing light reflected from a nearby object along essentially parallel paths to a patient's eyes in avoidance of convergence, placing in front of each eye that lens which imposes a relaxant force upon the ciliary muscles of the eye when engaged in reading or other relatively close work, and selecting said eye lenses such that the eyes view closeup objects with an essentially zero accommodation.

19. The method according to claim 18 including the modified step of progressively changing the power of said lenses in the positive diopter direction until said essentially zero accommodation condition is attained.

20. A therapeutic method for the treatment of acquired myopia and related or similar eye conditions, said method comprising the steps of directing light reflected from a nearby object along essentially parallel paths to a patient's eyes in avoidance of convergence, placing in front of each eye that lens which imposes a relaxant force upon the ciliary muscles of the eye when engaged in reading or other relatively close work, and selecting those lenses which impart a slight blurring when an object is held at a normal reading distance in provision of said relaxant force.

21. The method according to claim 18 including the initial step of splitting and deflecting said light into said parallel paths from a single objective path in avoidance of steroposis.

22. The method according to claim 20 including the initial step of splitting and deflecting said light into said parallel paths from a single objective path in avoidance of stereopsis.

23. A therapeutic method for the treatment of acquired myopia and related or similar eye conditions, said method comprising the steps of directing light reflected from a nearby object into parallel paths to a patient's eyes in avoidance of convergence, placing in front of each eye that lens which will effect an essentially zero accommodation in the patient's eyes for a given spastic condition, and progressively changing the power of said lenses to impose a positive relaxant force within the patient's eyes in progressive termination of said spastic condition.

24. The combination according to claim 17 wherein said optical system includes means for deflecting said objective light from a single objective path into said parallel paths in avoidance of stereopsis of the patient's eyes.

25. The combination according to claim 17 wherein said lens means in addition impart a light blurring when an object is held at normal reading distance.

* * * * *